(12) United States Patent
Beckmann (10) Patent No.: US 8,778,259 B2
(45) Date of Patent: Jul. 15, 2014

(54) SELF-RENEWING CUTTING SURFACE, TOOL AND METHOD FOR MAKING SAME USING POWDER METALLURGY AND DENSIFICATION TECHNIQUES

(76) Inventor: Gerhard B. Beckmann, Altamont, NY (US)

(*) Notice: Subject to any disclaimer, the term of this patent is extended or adjusted under 35 U.S.C. 154(b) by 0 days.

(21) Appl. No.: 13/068,969

(22) Filed: May 25, 2011

(65) Prior Publication Data
US 2012/0301675 A1 Nov. 29, 2012

(51) Int. Cl.
  *B22F 7/04* (2006.01)
  *B22F 3/15* (2006.01)
  *B22F 3/105* (2006.01)
  *B22F 7/08* (2006.01)

(52) U.S. Cl.
  USPC ........ 419/8; 419/23; 419/49; 419/52; 51/297; 51/307

(58) Field of Classification Search
  USPC ........... 419/8, 10, 11, 23, 49, 52; 51/297, 307
  See application file for complete search history.

(56) References Cited

U.S. PATENT DOCUMENTS

| 1,549,615 A | 8/1925 | Schorter |
| 1,615,223 A | 1/1927 | Grumplet |
| 1,721,416 A | 7/1929 | Schorter |
| RE17,624 E | 3/1930 | Schorter |
| 1,756,857 A | 4/1930 | Gilson |
| 1,812,811 A | 6/1931 | Strauss |
| 1,843,768 A | 2/1932 | Hoyt |
| 1,996,598 A | 4/1935 | Taylor |
| 2,179,888 A | 11/1939 | Green |
| 2,326,908 A | 8/1943 | Williams, Jr. |
| 3,192,973 A | 7/1965 | O'Link |
| 3,440,773 A | 4/1969 | Hawkes |
| 3,598,101 A | 8/1971 | Hensley |
| 3,681,846 A | 8/1972 | Gerber |
| 3,752,655 A | 8/1973 | Ramqvist |
| 3,871,840 A | 3/1975 | Wilder et al. |
| 3,975,891 A | 8/1976 | Gunther |
| 3,984,910 A | 10/1976 | Helton et al. |

(Continued)

FOREIGN PATENT DOCUMENTS

| AU | 4695501 | 10/2001 |
| CA | 2371608 | 11/2000 |

(Continued)

OTHER PUBLICATIONS

Miodownik, Mark and Brian Derby, "HIP Joining of Cemented Carbides," Sandia National Laboratories, Albuquerque, NM, USA, 1999, 9 pages.

(Continued)

*Primary Examiner* — George Wyszomierski
*Assistant Examiner* — Ngoclan T Mai
(74) *Attorney, Agent, or Firm* — Cesari and McKenna, LLP (57) ABSTRACT

A self-renewing cutting tool or cutting element is formed by bonding an overcoat, cladding or layer of highly abrasive, very durable material on a surface of a substrate or load-bearing element. The cutting layer is a composite structure and includes appropriately sized, multi-edged pieces of a superhard material, such as tungsten carbide, dispersed in a softer material which produces high strength bonds between and among the pieces and the substrate or load-bearing element.

18 Claims, 9 Drawing Sheets

(56) References Cited

U.S. PATENT DOCUMENTS

| | | | |
|---|---|---|---|
| 4,127,411 A | 11/1978 | Yajima et al. | |
| 4,258,763 A | 3/1981 | Figueredo et al. | |
| 4,277,106 A | 7/1981 | Sahley | |
| 4,311,490 A | 1/1982 | Bovenkerk et al. | |
| 4,383,809 A | 5/1983 | Hoffmuller | |
| 4,401,723 A | 8/1983 | Aslund et al. | |
| 4,485,757 A | 12/1984 | Ebner | |
| 4,533,004 A | 8/1985 | Ecer | |
| 4,554,130 A | 11/1985 | Ecer | |
| 4,593,776 A * | 6/1986 | Salesky et al. | 175/375 |
| 4,593,840 A | 6/1986 | Chown | |
| 4,726,927 A | 2/1988 | Morgan et al. | |
| 4,844,185 A | 7/1989 | Newton, Jr. et al. | |
| 4,944,800 A | 7/1990 | Kolaska et al. | |
| 5,025,873 A | 6/1991 | Cerkovnik | |
| 5,151,777 A | 9/1992 | Akin et al. | |
| 5,238,074 A | 8/1993 | Tibbitts et al. | |
| 5,238,334 A | 8/1993 | Brandt et al. | |
| 5,282,513 A | 2/1994 | Jones | |
| 5,290,507 A | 3/1994 | Runkle | |
| 5,361,748 A | 11/1994 | Matteucci | |
| 5,380,390 A | 1/1995 | Tselesin | |
| 5,456,312 A | 10/1995 | Lynde et al. | |
| 5,494,635 A | 2/1996 | Bennett | |
| 5,540,882 A | 7/1996 | Billgren | |
| 5,667,341 A | 9/1997 | Kuehn | |
| 5,672,382 A | 9/1997 | Lux | |
| 5,755,033 A | 5/1998 | Gunter et al. | |
| 5,899,268 A | 5/1999 | Lynde et al. | |
| 5,997,273 A | 12/1999 | Laquer | |
| 6,070,570 A | 6/2000 | Ueoka et al. | |
| 6,086,003 A | 7/2000 | Gunter et al. | |
| 6,105,261 A | 8/2000 | Ecer | |
| 6,187,068 B1 | 2/2001 | Frushour | |
| 6,207,294 B1 | 3/2001 | Rutter | |
| 6,210,633 B1 | 4/2001 | Kratt et al. | |
| 6,241,036 B1 | 6/2001 | Lovato et al. | |
| 6,355,211 B1 | 3/2002 | Huang | |
| 6,372,346 B1 | 4/2002 | Toth | |
| 6,389,699 B1 | 5/2002 | Ecer | |
| 6,458,471 B2 | 10/2002 | Lovato et al. | |
| 6,482,533 B2 | 11/2002 | Van Daam et al. | |
| 6,506,226 B1 | 1/2003 | Chen et al. | |
| 6,562,288 B2 * | 5/2003 | Park | 419/8 |
| 6,617,271 B1 | 9/2003 | Kodash et al. | |
| 6,630,102 B2 | 10/2003 | Wilmes | |
| 6,742,611 B1 | 6/2004 | Illerhaus et al. | |
| 6,852,414 B1 | 2/2005 | Frushour | |
| 6,915,796 B2 | 7/2005 | Sung | |
| 6,939,508 B2 | 9/2005 | Bampton et al. | |
| 6,969,240 B2 | 11/2005 | Strangman | |
| 6,998,173 B2 | 2/2006 | Liu et al. | |
| 7,036,599 B2 | 5/2006 | Matteucci | |
| 7,043,819 B1 | 5/2006 | Arnold | |
| 7,089,925 B1 | 8/2006 | Lin et al. | |
| 7,261,855 B2 | 8/2007 | Troitski et al. | |
| 7,373,935 B2 | 5/2008 | Lawler et al. | |
| 7,533,740 B2 | 5/2009 | Zhang et al. | |
| 7,556,668 B2 | 7/2009 | Eason et al. | |
| 7,560,065 B2 | 7/2009 | Troitski et al. | |
| 7,575,620 B2 | 8/2009 | Terry et al. | |
| 7,694,757 B2 | 4/2010 | Keshavan | |
| 7,717,199 B2 | 5/2010 | Svendsen et al. | |
| 7,736,582 B2 | 6/2010 | Toth | |
| 7,810,588 B2 | 10/2010 | McClain et al. | |
| 8,025,112 B2 | 9/2011 | Mirchandani et al. | |
| 8,220,566 B2 | 7/2012 | Eason et al. | |
| 8,220,567 B2 | 7/2012 | Scott et al. | |
| 8,221,517 B2 | 7/2012 | Mirchandani et al. | |
| 8,252,225 B2 | 8/2012 | Eason et al. | |
| 8,308,096 B2 | 11/2012 | Mirchandani et al. | |
| 8,316,969 B1 | 11/2012 | Bertagnolli et al. | |
| 8,322,465 B2 | 12/2012 | Mirchandani | |
| 2001/0000101 A1 | 4/2001 | Lovato et al. | |
| 2003/0111273 A1 | 6/2003 | Richert et al. | |
| 2004/0081572 A1 | 4/2004 | Bampton et al. | |
| 2004/0154840 A1 | 8/2004 | Azar et al. | |
| 2004/0179969 A1 * | 9/2004 | Wan et al. | 419/13 |
| 2005/0051366 A1 | 3/2005 | Frushour | |
| 2005/0079357 A1 | 4/2005 | Frushour | |
| 2005/0079358 A1 | 4/2005 | Frushour | |
| 2005/0117984 A1 | 6/2005 | Eason et al. | |
| 2005/0126334 A1 | 6/2005 | Mirchandani | |
| 2005/0214156 A1 | 9/2005 | Troitski et al. | |
| 2005/0230150 A1 | 10/2005 | Oldham et al. | |
| 2005/0275143 A1 | 12/2005 | Toth | |
| 2006/0042172 A1 | 3/2006 | Sung | |
| 2006/0078455 A1 | 4/2006 | Troitski et al. | |
| 2006/0193978 A1 | 8/2006 | Toth | |
| 2006/0266801 A1 | 11/2006 | Tonks et al. | |
| 2007/0089656 A1 | 4/2007 | Baylot | |
| 2007/0261629 A1 | 11/2007 | Choi | |
| 2008/0000466 A1 | 1/2008 | Lehmann | |
| 2008/0022991 A1 | 1/2008 | Lawler et al. | |
| 2008/0202821 A1 | 8/2008 | McClain et al. | |
| 2008/0253919 A1 | 10/2008 | Theisen et al. | |
| 2009/0226338 A1 | 9/2009 | Troitski et al. | |
| 2009/0274923 A1 | 11/2009 | Hall et al. | |
| 2009/0293672 A1 | 12/2009 | Mirchandani et al. | |
| 2009/0314149 A1 | 12/2009 | Clark, II | |
| 2010/0041315 A1 | 2/2010 | Sung | |
| 2010/0044114 A1 | 2/2010 | Mirchandani et al. | |
| 2010/0044115 A1 | 2/2010 | Mirchandani | |
| 2010/0058967 A1 | 3/2010 | Baylot et al. | |
| 2010/0192476 A1 | 8/2010 | Theisen et al. | |
| 2010/0243336 A1 | 9/2010 | Dourfaye | |
| 2011/0009039 A1 | 1/2011 | Balagani et al. | |
| 2011/0011965 A1 | 1/2011 | Mirchandani et al. | |
| 2011/0030440 A1 | 2/2011 | Keane et al. | |
| 2011/0045292 A1 | 2/2011 | Tian et al. | |
| 2011/0138695 A1 | 6/2011 | Eason et al. | |
| 2011/0263187 A1 | 10/2011 | Liu et al. | |
| 2012/0017741 A1 | 1/2012 | Lange et al. | |
| 2012/0037140 A1 | 2/2012 | Campos et al. | |
| 2012/0193152 A1 | 8/2012 | Russell et al. | |

FOREIGN PATENT DOCUMENTS

| | | |
|---|---|---|
| CA | 2770291 | 2/2011 |
| CN | 102356211 A | 2/2012 |
| CN | 102413983 | 4/2012 |
| DE | 1227374 | 5/1967 |
| EP | 0149530 | 7/1985 |
| EP | 0 356 097 | 2/1990 |
| EP | 0493351 | 7/1992 |
| EP | 0 540 834 A1 | 5/1993 |
| EP | 0630713 | 12/1994 |
| EP | 2165790 | 3/2010 |
| EP | 2 363 340 | 9/2011 |
| GB | 354641 | 11/1929 |
| GB | 1 475 412 | 6/1977 |
| GB | 2 239 264 | 6/1991 |
| GB | 2 239 264 A | 6/1991 |
| GB | 2 276 886 | 10/1994 |
| GB | 2 276 886 A | 10/1994 |
| GB | 2 376 242 | 12/2002 |
| GB | 2424200 | 9/2006 |
| GB | 2474280 | 4/2011 |
| JP | 10-328932 | 12/1998 |
| NL | 2002451 | 7/2010 |
| SU | 757391 | 8/1980 |
| WO | WO-95/03126 A1 | 2/1995 |
| WO | WO 98/51419 | 11/1998 |
| WO | WO-99/61211 A1 | 12/1999 |
| WO | WO 00/15942 | 3/2000 |
| WO | WO-00/66332 A1 | 11/2000 |
| WO | WO 01/76797 | 10/2001 |
| WO | WO 03/009960 | 2/2003 |
| WO | WO-2004/000543 A1 | 12/2003 |
| WO | WO 2006/001791 | 1/2006 |
| WO | WO 2008/133529 A1 | 11/2008 |
| WO | WO 2009/084953 A1 | 7/2009 |
| WO | PCT/GB2010/051545 | 9/2010 |
| WO | WO 2010/092151 | 9/2010 |

(56) References Cited

FOREIGN PATENT DOCUMENTS

| WO | WO-2010/111578 A1 | 9/2010 |
|---|---|---|
| WO | WO 2010/125085 | 11/2010 |
| WO | WO 2011/017318 | 2/2011 |
| WO | WO 2011/041141 | 4/2011 |
| WO | WO 2007/149266 | 12/2011 |

OTHER PUBLICATIONS

Santhanam, A.T., "Carbides, Cemented," Kirk-Othmer Encyclopedia of Chemical Technology, vol. 4, John Wiley & Sons, Jun. 2003, 20 pages.

"Raising the Kursk" by Peggy Chambers, *Mechanical Engineering Magazine*, The American Society of Mechanical Engineers, 2002, 9 pages <http://www.memagazine.org/backissues/membersonly/may02/features/thekursk/thekursk.html>.

"Smit uses new wreck-removal tool in Kursk operation. (Update)." *Marine Log*, Mar. 1, 2002, 2 pages <http://www.allbusiness.com/transportation-equipment-manufacturinq/ship-boat-building/406951-1.html>.

"Commercial Development for 'Kursk' Cutting System" *Maritime Journal*, Feb. 1, 2002, Mercator Media 2010, 2 pages <http://www.maritimejournal.com/features101/tugs,-towing,-pollution-and-salvage/tugs,-towing-and-salvage/commercial_development_for_kursk_cutting_system>.

"Kursk" *Smit*, Oct. 23, 2001, 2 pages <http://www.smit.com/sitefactor/page.asp?pageid=148 >.

"Kursk Bow Was Cut by New Sawing Technology" *Engineering Capacity*, Mar. 1, 2002, Mercator Media 2010, 2 pages < http://www.engineeringcapacity.com/features101/machining/kursk_bow_was_cut_by_new_sawing_technology>.

International Search Report and Written Opinion for International Application No. PCT/US2012/000253 filed on May 23, 2012 by Gerhard B. Beckmann, mailing date Oct. 5, 2012, 13 pages.

Troitski et al., "Method of Manufacturing Self-Renewing Cutting Tools by Using Hot Isostatic Pressing of Powder Materials", U.S. Appl. No. 12/803,359, filed Jun. 25, 2010, 16 pages.

"Defendant's Answer to Complaint", United States District Court, Central District of California, Case No. 8:11-cv-01421-CJC-RNB, filed Mar. 23, 2012, 36 pages.

"Kittyhawk, Inc's Answer to Plaintiff's Second Amended Complaint", United States District Court, Central District of California, Southern Division, Case No. 8:11-cv-01421-CJC-RNB, filed May 10, 2012, 14 pages.

"Syntertech Defendants' Answer", United States District Court, Central District of California, Southern Division, Case No. 8:11-cv-01421-CJC-RNB, filed May 10, 2012, 19 pages.

"Wreck Removal Cutting System" <marinetalk.com/articles-marine-companies/art/Wreck-Removal-Cutting-System-SMI01074908TU.html> Dec. 18, 2012, 2 pages.

"Wreck Removal Cutting System" <finance.dir.groups.yahoo.com/group/MarineTechniquesPublishing/message/402>, Feb. 6, 2002, 1 page.

Scaldis Salvage & Marine Contractors NV/ Salvage Works website flyer, www.scaldis-smc.com/salvage.htm, copyright 2008, 2 pages.

"Deal Struck to Remove Sunken Car-ship" Apr. 12, 2003, www.telegraph.co.uk/news/1427355/Deal-stuck-to-remove-sunken-car-ship.html, 1 page.

Wojdyla, Ben, "How to Salvage a Sunken Car Freighter," jalopnik.com/5584840/kow-to-salvage-a-sunken-car-freighter, Jul. 12, 2010, 4 pages.

"Commercial Development for "Kursk" Cutting System" Feb. 1, 2002, Maritime Journal, maritimejournal.com/news101/.../commercial_development_for_kursk_cutting_system, 2 pages.

"Raising the Tricolor" MER, Jul./Aug. 2003, 3 pages.

"Smit Develops High-Powered Wreck Removal Cutting System," Maritime Reporter and MarineNews magazines online, Marinelink.com, Mar. 6, 2002, <marinelink.com/news/article/smit-develops-high-powered-wreck-removal-cutting-system/321516.aspx, 2 pages.

Tricolor Salvage FAQ Flyer, web.archive.org/web/20090508064031/http://www.tricolorsalvage.com/pages/faq.asp, 3 pages '2004.

"Tricolor Wreck Removal Resumes" May 14, 2004, Maritime Reporter and MarineNews Magazines online, MarineLink.com, www.marinelink.com/news/article/tricolor-wreck-removal-resumes/322846.aspx, 2 pages.

"Cutting of the Tricolor Starts Today," Jul. 22, 2003, Maritime Reporter and MarineNews magazines online, MarineLink.com, www.marinelink.com/news/article/cutting-of-tricolor-starts-today/306786, 2 pages.

SMIT flyer "Tricolor" Jan. 2003, 1 page.

SMIT Salvage Website flyer, www.smit.com, Company Profile, Jun. 2010, 12 pages.

Teti, R., "Machining of Composite Materials," University of Naples, Federico II, Italy, 2002, 26 pages.

Crosher, William, "ToothTips", gearsolutions.com, Jun. 2008, 1 page.

Davis, J.R., *Surface Engineering for Corrosion and Wear Resistance*, ASM International, Materials Park, OH, Mar. 2001.

Zimmerman, Franz X., "Hot Isostatic Pressing: Today and Tomorrow," Avure Technologies, www.avure.com, Jan. 2008, 12 pages.

Berry et al., "Conceptual Design for Remote Handling Methods using the HIP Process in the Calcine Immobilization Program," prepared for the Department of Energy Idaho Operations Office, Mar. 1994, 43 pages.

Tungsten Carbide Product Guide, Tungsten Carbide Tools manufacturer, exporter, supplier and distributer from China, www.tungstenchina.com/productiTungsten-Carbide-Tools.html, copyright 2011, 4 pages.

Toth et al., "Tough-coated Hard Powders for HardMetals of Novel Properties," TCHP Inventor, EnDurAloy Corporation, Savannah, Georgia, 15$^{th}$ International Plansee Seminar, Eds. G. Knerigner, P. Rodhammer and H. Wildner, Plansee Holding AG, Reutte 2001, vol. 2, pp. 306-325.

"1926 Krupp Markets WIDIA Tool Metal," ThyssenKrupp AG, Jan. 28, 2009, pp. 1.

Ala-Kleme, Sanna, et al., "Abrasive Wear Properties of Metal Matrix Composites Produced by Hot Isostatic Pressing," Proc. Estonian Acad. Sci. Eng., Jul. 31, 2006, pp. 1-10.

Broeckmann, Christopher, et al., "HIP Cladding of Briquetting Tools with Thick Wear Resistant Coatings," Koppern-Entwicklungs-GmBh, Haltingen, Germany, 2008, pp. 1-10.

"Cemented Carbide," Wikipedia.org, <http://en.wikipedia.org/w/index.php?oldid=550328362>, Apr. 4, 2013, pp. 1-5.

"Daily Collection of Maritime Press Clippings," Sep. 16, 2010, pp. 1-29.

Hebeisen, John, et al., HIP'05: Proceeding of the 2005 International Conference on Hot Isosatic Pressing, SF2M, May 22-25, 2005, pp. 1.

"Hot Isostatic Pressing," Wikipedia.org, <http://en.wikipedia.org/w/index.php?oldid=550621370>, Apr. 16, 2013, pp. 1-2.

"Hot Isostatic Pressing: Topics Covered," Scribd Inc., <http://www.scribd.com/doc/47296101/Hot-Isostatic-Pressing>, Jan. 21, 2011, pp. 1-17.

"Introduction to Metallurgy: The Processes and Its Products," European Powder Metallurgy Association, 2008, pp. 1-36.

"Kursk Bow Cut by New SMIT Technology,"Sep. 17, 2001, pp. 1-6.

"Metal Matrix Composite," Wikipedia.org, <http://en.wikipedia.org/w/index.php?oldid=541118489>, Feb. 28, 2013, pp. 1-4.

Rateick, Jr., R. G., et al., "Solid-Particle Erosion of Tungsten Carbide/Cobalt Cermet and Hardened 440C Stainless Steel—A Comparison," Elsevier B. V., Jul. 14, 2005, pp. 1-6.

Schade, P., "100 Years of Doped Tungsten Wire,"Int. Journal of Refractory Metals and Hard Materials, Elsevier, Ltd., 2010, pp. 1-13.

Schubert, Wolf-Dieter, et al., "Cemented Carbides—A Success Story," Tungsten, Jun. 2010, pp. 1-12.

Shearer, Thomas R. "The Designer's Guide to Tungsten Carbide," Generalcarbide, Aug. 2007, pp. 1-52.

Singh, J. et al., "Review Nano and Macro-Structured Component Fabrication by Electron Beam-Physical Vapor Deposition (EB-PVD)," Journal of Materials Science, Springer Science and Business Media, Inc., 2005, pp. 1-26.

(56) References Cited

OTHER PUBLICATIONS

Theisen, W., "HIP Cladding of Tools," 6th International Tooling Conference, Sep. 2002, pp. 1-14.

Theisen, W., "Walzen aus Pulver," Werkstoffe, mashinenbau RUBIN, 2004, pp. 1-6.

"The Range of Application for Hot Isostatic Pressing (HIP) is Growing Fast," Bodycote, PLC, prior to May 8, 2013, pp. 1-10.

U.S. Appl. No. 61/231,149, filed Aug. 4, 2009 by John M. Keane et al. for Tough Coated Hard Particles Consolidated in a Tough Matrix Material, pp. 1-60.

Toth, et al., "Development Progress: Sintered Tough-Coated Hard Powders (TCHPs)" EuroPM 2004, 6 pages.

HIP'08 Proceedings of the 2008 International Conference on Hot-Isostatic Pressing, Huntington Beach, CA, May 6-9, 2008, edited by Dr. Stephen J. Mashl, 8 pages.

File History for U.S. Appl. No. 61/088,981, filed Aug. 14, 2008 by Chien-Min Sung for Self-Sharpening Grits and Associated Methods, 49 pages.

SMIT Salvage flyer, www.cotzias.gr/smit_salvage.htm, Dec. 18, 2012, 2 pages.

Tricolor Salvage Flyer—"Salvage of the Tricolor," 2003, 1 page.

"Kursk—Salvage of the Russian nuclear submarine 'Kursk' and transport of the submarine into a drydock in Murmansk" www.smit.com/projects/projectkursk.html, Dec. 17, 2012, 2 pages.

\* cited by examiner

SELF-RENEWING CUTTING SURFACE, TOOL AND METHOD FOR MAKING SAME USING POWDER METALLURGY AND DENSIFICATION TECHNIQUES

BACKGROUND OF THE INVENTION

1. Field of the Invention

The present invention relates generally to the field of cutting tools and cutting elements and, more specifically, to self-renewing cutting tools and elements for cutting hard materials such as metals or metallic structures that may be in aqueous environments.

2. Background Information

Conventional cutting tools and elements for cutting metals and other tough surfaces may be made of a superhard material such as tungsten carbide. While conventional cutting tools and elements provide good performance under normal operating conditions and loads, they may not be suitable for applications in which harsh environmental conditions are present or high loads must be applied to cut large and or very complex structures. For example, in certain large scale demolition operations, it is often desirable or necessary to cut completely through a large objects comprised at least in part of metal or other difficult to cut surfaces in order to section them into more manageable sized to effect removal. Depending upon the environment in which the demolition takes place, including the orientation and balance of the object(s) to be cut, as well as the size and hardness of the object being cut or abraded, it may be impractical or unsafe to perform such cutting other than by tools which can be actuated some distance from the point of the cut.

Under normal operating conditions, conventional cutting tools will wear and eventually become dull or damaged which, in turn, reduces cutting performance. Under difficult operating conditions or sustained high loads (or both), conventional cutting tools tend to wear at an accelerated rate, leading to increased downtime to replace worn or broken tools. In addition, the basic geometries of conventional cutting tools may not be appropriate or effective for cutting objects that are massive and/or complex (e.g., an object made of multiple materials and/or systems, or a submerged structure).

As shown in the literature, one known approach to cutting massive and/or complex objects is to braze pieces of a superhard material, such as tungsten carbide, to a surface of a tool. That approach suffers from at least one major disadvantage. Because brazing does not provide a sufficiently strong bond between and among the pieces of superhard material, the braze material and the tool surface, the pieces of superhard material become dislodged during cutting operations. The loss of superhard pieces, in turn, degrades the performance of the tool thereby necessitating more frequent repair or replacement.

SUMMARY OF THE INVENTION

In brief summary, a self-renewing cutting tool or cutting element is formed by forming or bonding an overcoat, cladding or layer including superhard, very durable constituents on a surface of a substrate or load-bearing element. The cutting layer is a is composite structure and includes appropriately sized, multi-edged pieces of a superhard material, such as tungsten carbide, interspersed with a bonding material which produces high strength bonds between and among the pieces and the substrate or load-bearing element and forms an integral composite of the plurality of materials.

When the cutting layer is initially formed, portions of at least some of the superhard pieces typically protrude from a wear surface of the layer and are thus available to remove material wear surface is worked against an object. As the wear surface is worked, the bonding material of the cutting layer may gradually wear away exposing additional edges of pieces and additional pieces of the superhard materials in a self-renewing cycle.

In accordance with another aspect of the invention, the cutting layer may be formed from a combination of superhard pieces and one or more powder materials having appropriate bonding characteristics. Through application of a hot isostatic pressing (HIP) process, the combination is densified and diffusion bonded between and among the superhard pieces, the bonding material and the substrate or load-bearing element. As used herein, densification and related terms refer to a process in which the mass density of a body or aggregation increases as a result of the controlled application of temperature and/or pressure.

In accordance with another aspect of the invention, the cutting layer may be formed from a combination of superhard pieces and one or more powder metals having appropriate bonding characteristics. Through the application of spark plasma sintering (SPS), the combination is densified and diffusion bonded to the substrate or load-bearing element.

In accordance with another aspect of the invention, the cutting layer may be formed on almost any substrate or load-bearing element geometry, as desired for a particular application including but not limited to planar, spherical, elliptical, conical, polyhedral, and cylindrical geometries. In order to meet the requirements of a particular application, a substrate or load-bearing element may include one or more features which are specially adapted or arranged to accommodate the cutting layer. Similarly, the cutting layer material may be formed in a desired pattern, as opposed to a continuous layer, on a substrate or load-bearing element.

In accordance with another aspect of the invention, the superhard pieces may be formed by crushing or fracturing recycled (used) tungsten carbide machine tool inserts.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
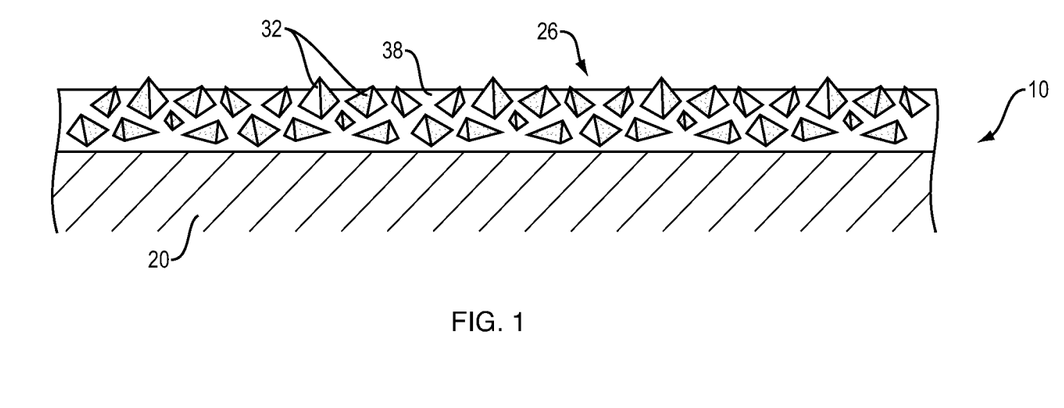
FIG. 1 is a cross section of a finished cutting element having a cutting layer bonded to a substrate or load bearing element in accordance with a preferred embodiment of the present invention.

With reference to FIG. 1, a structure 10 serviceable as a cutting element includes a substrate or load-bearing element 20 on which a layer 26 is formed of particles or pieces 32 of a first material embedded in or bonded to a continuous second material 38. Layer 26 represents a substantially fully dense overcoat, cladding or cutting layer bonded to substrate 20. The thickness of second material 38 may vary from point to point on substrate 20, and may conformally coat pieces 32. Those skilled in the art will understand that second material 38 may comprise an alloy or a material comprising more than one type of compound. Those skilled in the art will further understand that substrate 20 and superhard pieces 32 may be fabricated from any number of materials and methods, provided that they will bond among and between themselves when interspersed with or dispersed within second material 38.

As is understood by those skilled in the art, cutting and abrading are different mechanisms of removing material. Cutting is a shearing action where a chip of the material to be removed is formed. Abrading is the wearing away of material through the use of friction. As used herein, the terms "cut" and "cutting" and their derivatives should be understood to include cutting or abrading or both.

Figure 2A:
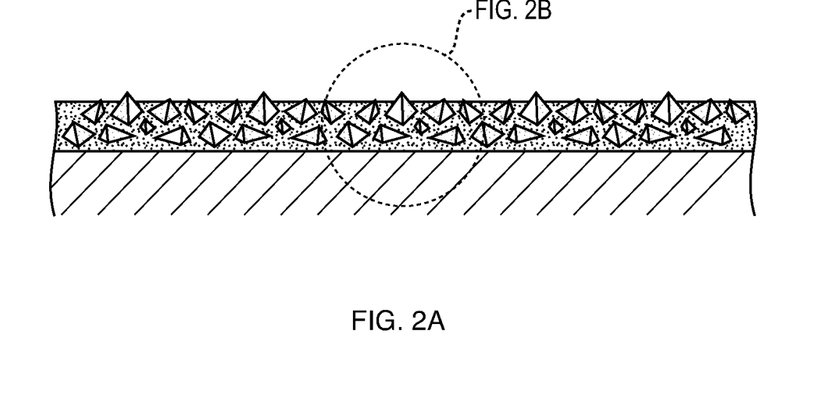
FIG. 2A is a cross section and FIG. 2B is an enlarged cross section of the cutting layer of FIG. 1 showing a typical dispersion of superhard pieces bearing cutting edges within the cutting layer.
Figure 2B:
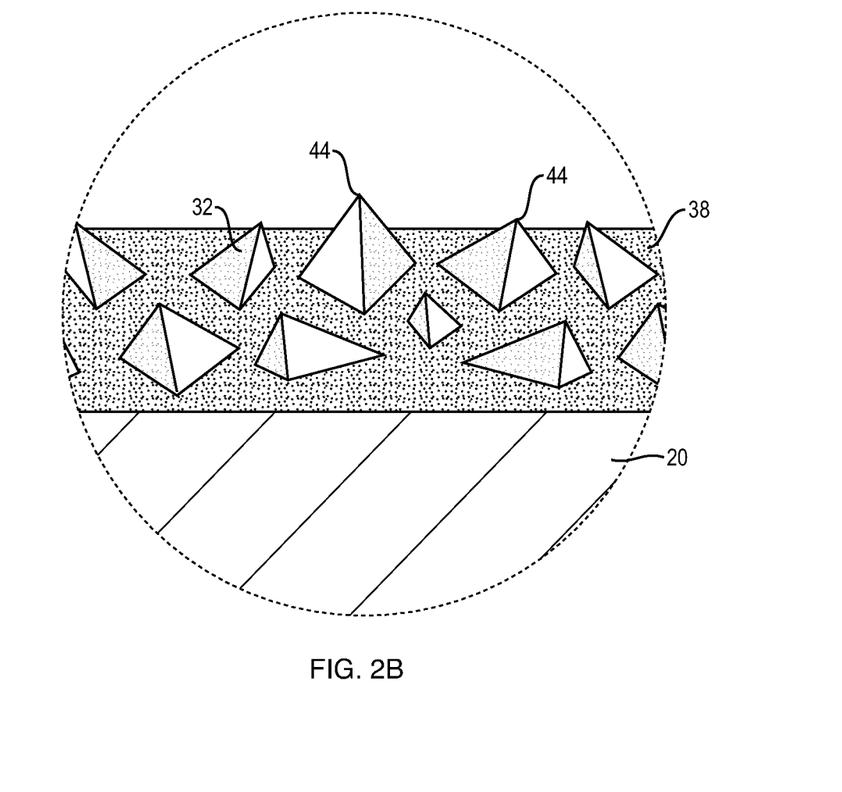

Illustratively, pieces 32 are of a superhard material (>12 GPa Vickers) and provide multiple respective cutting edges 44 shown in FIGS. 2A and 2B. Examples of superhard materials include, but are not limited to, tungsten carbide, zirconium oxide, silicon carbide, cubic boron nitride and polycarbonate diamond. Alternatively, somewhat softer but appropriate material such as tool steel may be used. Pieces 32 are generally dispersed throughout or interspersed with second material 38. One or more of pieces 32 may protrude from second material 38 such that cutting edges 44 are typically randomly oriented and, in aggregate, provide a highly effective cutting surface. Alternatively, pieces 32 may be oriented in a preferential manner to better expose cutting edges 44 and provide a more effective cutting surface. Layer 26 is so constituted such that cutting edges 44 of those pieces 32 lying beneath the cutting surface of layer 26 are gradually exposed upon wearing of the second material 38. Thus, structure 10 may be adapted (e.g., secured to an appropriate fixture and power source) to cut an object worked against the cutting surface of layer 26 with continual self-renewal of the cutting surface.

In general, pieces 32 are of irregular and nonuniform shape but characterizable in terms of an average of the shortest diameters of respective pieces 32, which may be up to several inches. A powder used to prepare second material 38, as described below, may be, e.g., spherical or dendritic in morphology and has an average longest particle diameter of respective particles of the powder. The average longest particle diameter of the powder form of second material 38 before densification may be on the order of 0.05, 0.005, or 0.00005 times the average shortest diameter of pieces 32 or less. For example, pieces 32 may have average shortest diameter on the order of up to several inches, whereas the average longest particle diameter may be several thousandths of an inch to tenths of inches. Illustratively, second material 38 has a hardness that is less than ½ the hardness of the first material of which pieces 32 are made.

The strength of the bonds between a given one of pieces 32 and second material 38 in structure 10 is preferably greater than the strength of an individual one of pieces 32, so that under stress layer 26 loses pieces 32 more readily by breaking a piece 32 or removing a portion of the second material 38 than by detachment of the second material 38 from one of the pieces 32. Thus, the continuous second material 38 is configured to transfer load, during contact between layer 26 and an object to be cut or abraded from cutting edges 44 to substrate 20.

The material for substrate 20 of structure 10 is selected for its preferred properties, including but not limited to its ability to bear load, strength, resistance to corrosion in relevant environments, expense or other considerations. Illustratively, where strength is a very important consideration substrate 20 may be a steel such as 4340 alloy steel. There is no requirement that substrate 20 be metallic in nature. Illustratively, pieces 32 are of a material that is at least three times, five times, or ten times as hard as second material 38. Tungsten carbide is a superhard material available commercially as recycled fragments (Dynalloy Industries, Inc., Tomball, Tex.) having sharp cutting edges and suitable for pieces 32. The second material 38 in layer 26 is illustratively a metallic alloy, for example having the composition of a powder such as B27 (Carpenter Powder Products, Inc., Bridgeville, Pa.) which includes nickel, silicon, boron and carbon.

Figure 3:
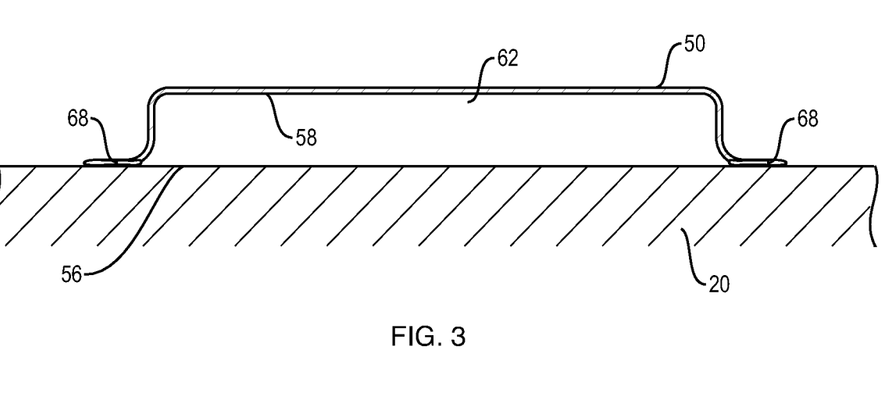
FIG. 3 is a cross section of an assembly of a load bearing element, located within a can, to which a cutting layer will be applied.

Layer 26 is illustratively formed by placing a powder substantially identical in composition to second material 38 in intimate contact between and among pieces 32 and between pieces 32 and substrate 20 and then subjecting substrate 20, pieces 32 and the powder form of second material 38 to a densification process such as HIP. In an illustrative method for forming structure 10 (FIG. 1), with reference to FIG. 3, a can 50, alternatively designated a skin or encapsulation, as is used to contain pieces 32 and the powder form of second material 38 during HIP, is disposed over a surface 56 on substrate 20. Can 50 is spaced apart from surface 56 of substrate 20 to form a cavity 62. Inert material 68, for example alumina, may be disposed upon or applied to an interior surface 58 to prevent interior surface 58 of can 50 from bonding to pieces 32, and to facilitate removal of can 50 from substrate 20 later in the method. Alternatively, a material that does not bond with pieces 32 or the powder, for example a piece of carbon paper such as Grafoil® (Graftech International Holdings, Inc., Parma, Ohio) whose thickness is selected based on the desired characteristics may be used. Those skilled in the art will recognize that it may be preferable to fabricate can 50 from a material that does not bond with pieces 32 or second material 38.

Figure 4:
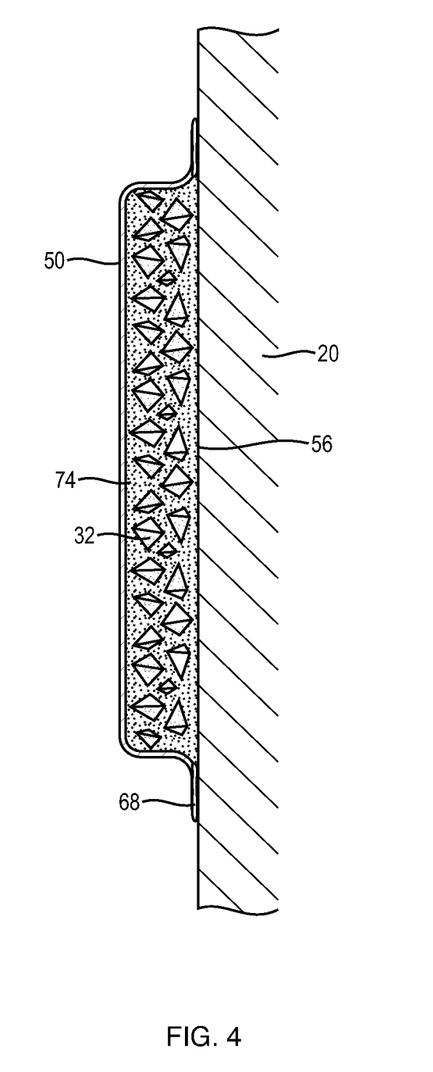
FIG. 4 is a cross section of the assembly of FIG. 3 in which a metal powder and superhard pieces have been introduced in preparation for a hot isostatic pressing.

A substantially uniform mixture of pieces 32 (FIG. 1) and the powder to be densified into second material 38 is introduced into cavity 62. FIG. 4 shows can 50 holding the mixture which substantially fills the volume between neighboring ones of pieces 32 and between the pieces and can 50 and surface 56. Substrate 20, pieces 32 and powder 74 thus assembled constitute a precursor to the final structure 10 (FIG. 1).

Returning to FIG. 4, the mixture is illustratively created in cavity 56 stepwise by first loading pieces 32 into the cavity from its top end and then pouring powder 74 to appropriately fill remaining space between can 50 and surface 56. Preferably, pieces 32 may occupy about 40% to 60% of cavity 62.

Preferably, powder 74 may occupy the volume in the cavity 62 not occupied by the pieces 32 at the tap density of powder 74.

Cavity 62 is then evacuated, sealed, placed in a hot isostatic press and heated under isostatic pressure, as understood by those skilled in the art. The operating parameters of the hot isostatic pressing operation are selected in view of the physical and sintering properties of the materials of which substrate 20, pieces 32 and powder 74 are made to consolidate the powder 74 and pieces 32 and substrate 20, as known to those skilled in the art. By way of illustration, and not limitation, typical process temperatures are 0.9 to 0.95 times the melting temperature of powder 74 with typical pressures around 10 to 30 Ksi. During HIP, particles of powder 74 (FIG. 4) consolidate into a continuous phase 38 (FIGS. 2A and 2B) which is diffusion bonded to pieces 32 and substrate 20. Illustratively, substrate 20 and pieces 32 need not densify during HIP.

Figure 5:
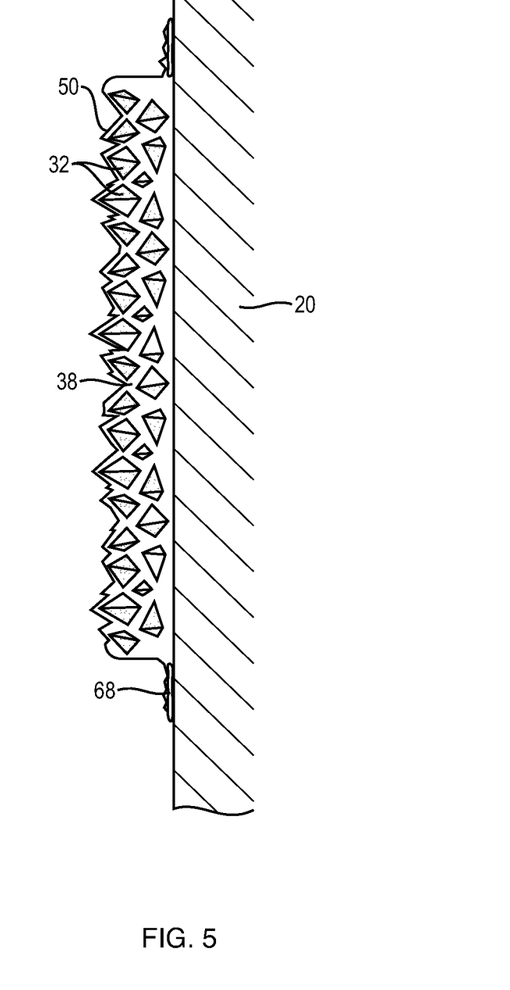
FIG. 5 is a cross section of the assembly of FIG. 4 following the application of hot isostatic pressing and prior to removal of the can.

FIG. 5 shows the assembly of FIG. 4 after densification of powder 74, with commensurate reduction of the volume it occupies following HIP. Can 50 has assumed a conformal profile accommodating the relatively reduced volume of second material 38 and pieces 32 protruding therefrom due to the HIP process. Removal of can 50 by, e.g., a mechanical or chemical process exposes protruding portions of pieces 32 illustratively bearing cutting edges 44 as shown in FIGS. 2A and 2B.

Using the method described above, a cutting layer, overcoat or cladding similar in composition to layer 26 may be formed on a wide variety of substrate or load-bearing element geometries including planar, spherical, elliptical, conical, polyhedral and cylindrical.

Figure 6:
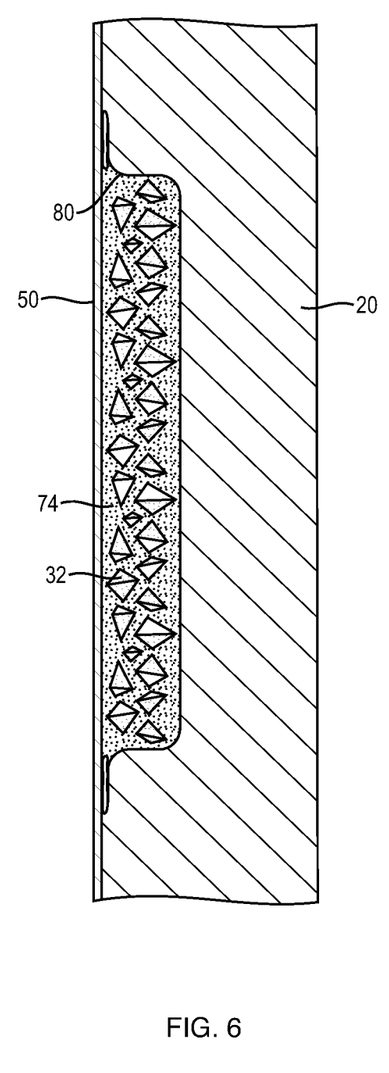
FIG. 6 is a cross section of a load bearing element which includes a recessed area or feature in which a cutting layer is disposed.

FIG. 6 shows an alternative configuration of substrate 20 in which a concavity 80 is disposed. Concavity 80 is substantially filled with the mixture of pieces 32 and powder 74 as described above. In preparation for a HIP process, concavity 80 is sealed by can 50. Those skilled in the art will recognize that a concavity 80 may be combined with a specifically configured can 50 to provide for the formation of custom layer 26 profiles.

Figure 7:
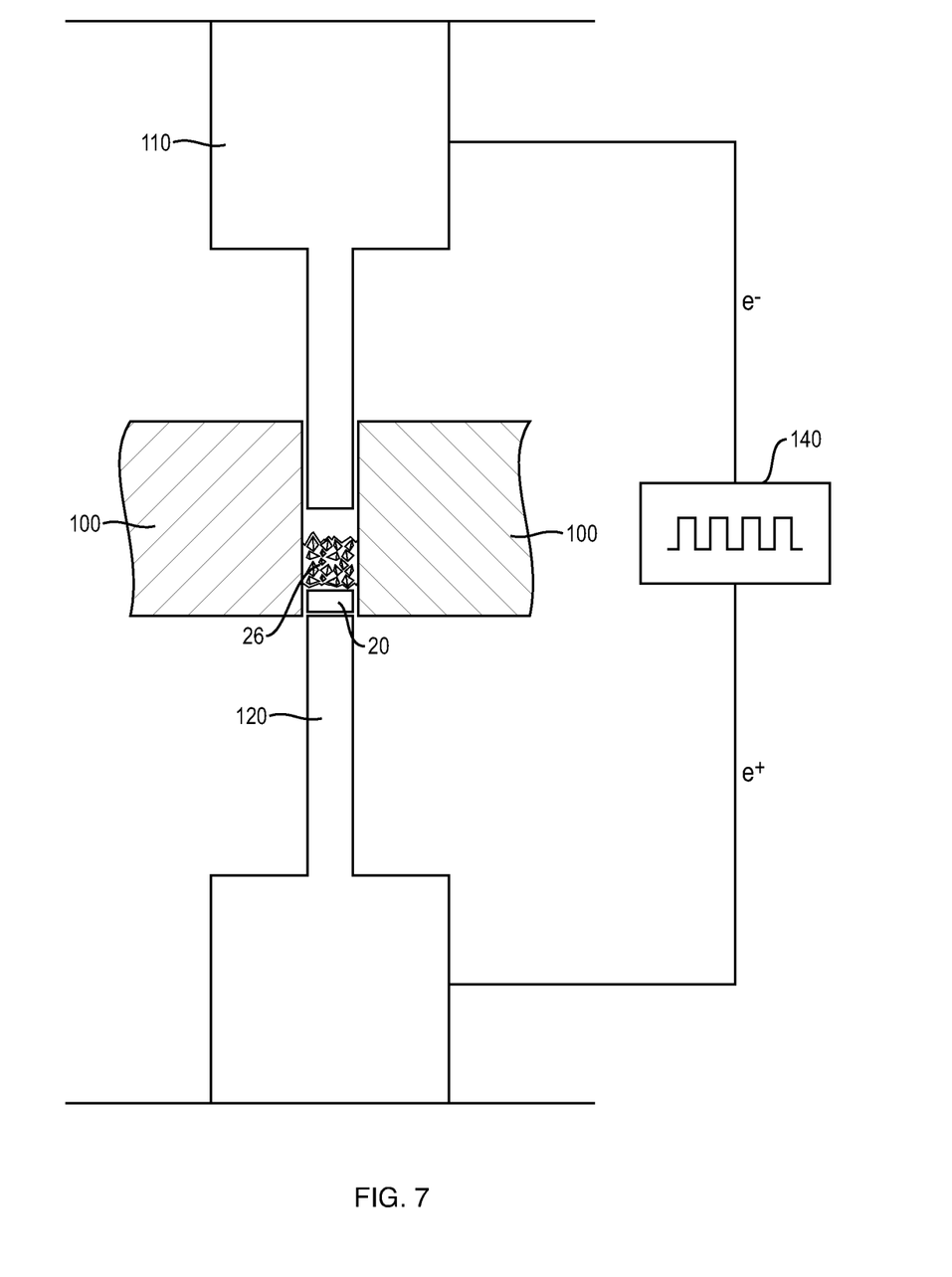
FIG. 7 is a schematic diagram of a spark plasma sintering system which may alternatively be used to form the cutting layer of FIG. 1.
Figure 8:
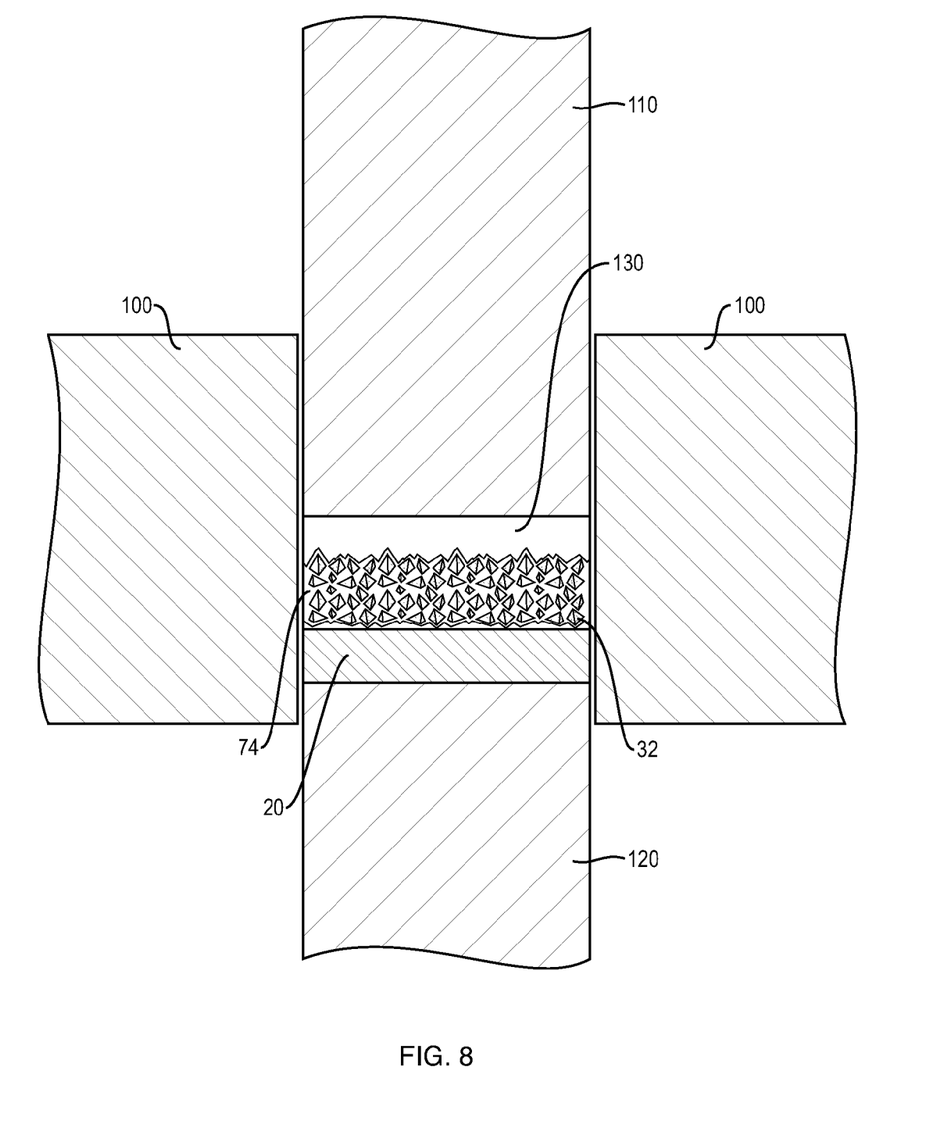
FIG. 8 is an enlarged schematic view of the central portion of FIG. 7.

As an alternative to HIP, spark plasma sintering (SPS) may be used to provide densification in order to form a structure like structure 10 (FIG. 1). SPS may be employed to fabricate layer 26 using similar, if not identical materials as those described above. With reference now to FIGS. 7 and 8, in the SPS process, powder 74 and superhard pieces 32 are disposed in a volume within tooling 100 between an upper press platen 110 and a lower press platen 120. An appropriate volume of respective superhard pieces 32 and powder 74 of appropriate ratios are placed within the tooling volume. Densification and sintering takes place under mechanical pressure that is applied by lowering upper press platen 110 and/or raising lower press platen 120 in opposition. The necessary temperature is produced by passing a pulsed high electrical current from a power source 140 through the tooling, as well as the powder and/or superhard pieces, thereby generating heat from the electrical resistance. In SPS a layer of electrically conductive powder 130, such as carbon powder, is placed in contact with an electrode, tooling, powder 74 and pieces 32, to accommodate the rough surface morphology of powder 74 and pieces 32.

Initially, powder 74 is at tap density and there are points of contact between and among powder particles, substrate and other powder particles. In some instances it may be necessary or desirable to mechanically compress powder 74 and pieces 32 prior to the application of the electrical current.

Once pressure is applied these contacts are effected and any oxide layers that may have been present may be broken down. The electric current produces high heating rates (>300° C./min are attainable) and heat is generated internally as opposed to being provided from the outside. Substantial densification results and cycle times on the order of minute(s) are possible. Custom tool designs can provide a wide range of desired post SPS tool geometries.

Figure 9:
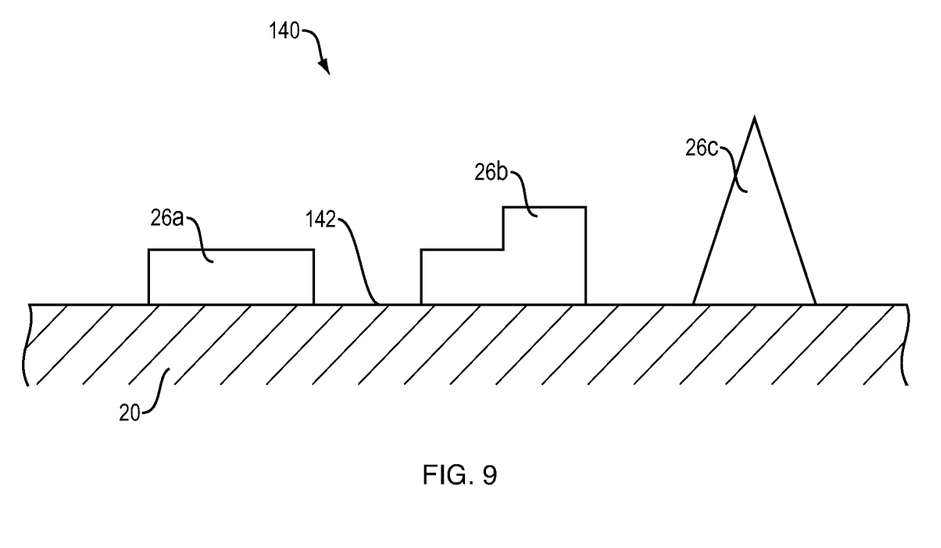
FIG. 9 is a cross section of a finished cutting element having a cutting layer bonded to selected portions of a substrate or load bearing element.

FIG. 9 shows a cross section of a structure 140 which includes a substrate or load-bearing element 20 similar that described above. In contrast to structure 10 of FIG. 1, however, substrate 20 does not have a continuous composite cutting layer bonded to it. Instead, as those skilled in the art will recognize, powder manufacturing techniques allow for patterning or selective application of a cutting layer to substrate 20. Material 26a-26c, which is similar in composition to layer 26 described above, is preferentially disposed on substrate 20, leaving at least one untreated area 142. Such material may be applied in any number of more complex patterns or shapes including a simple, substantially uniform layer 26a disposed over a portion of the substrate 20, a layer with varying thickness 26b, or a more complex feature, such as a cone, rail, or ridge 26c. In addition, the composition of material 26a-26c may also change as a function of its depth, depending on the desired properties.

Those skilled in the art will recognize that powder manufacturing techniques make it possible to use various materials for pieces 32, powder 74, second material 38 or substrate 20, as long as the materials will bond to and among each other. In particular ceramics, intermetallics, stellites, diamond, alumina, silicon carbides, titanium nitrides, may be used for each of the above mentioned elements.

What is claimed is:

1. A method of manufacturing a composite structure comprising the steps of:
   providing a substrate;
   providing a plurality of pieces of a first material having cutting edges on the substrate;
   placing a powder of a second material on the substrate in intimate contact with the plurality of pieces to form a precursor; and
   subjecting the precursor to a densification process that comprises hot isostatic pressing (HIP), thereby converting the powder and plurality of pieces of the first material to a substantially fully dense composite cladding bonded to the substrate, the composite cladding having pieces of the first material interspersed with the second material, at least some cutting edges of the first material initially lying beneath a surface of the second material and being exposable by wear of the second material.

2. The method of claim 1, further comprising:
   containing the precursor with a can;
   heating the can under isostatic pressure; and
   removing the can after densification has occurred.

3. The method of claim 1, wherein the first material has a hardness greater than 12 GPa Vickers.

4. The method of claim 1, wherein the first material comprises tungsten carbide, zirconium oxide, silicon carbide, cubic boron nitride, polycarbonate diamond, or tool steel.

5. The method of claim 1, wherein the pieces of the first material are randomly oriented when interspersed with the second material.

6. A method of manufacturing a composite structure comprising the steps of:
   providing a substrate;
   providing a plurality of pieces of a first material having cutting edges on the substrate, wherein the pieces of the first material each have an irregular, nonuniform shape;

placing a powder of a second material on the substrate in intimate contact with the plurality of pieces to form a precursor; and subjecting the precursor to a densification process, thereby converting the powder and plurality of pieces of the first material to a substantially fully dense composite cladding bonded to the substrate, the composite cladding having pieces of the first material interspersed with the second material, at least some cutting edges of the first material initially lying beneath a surface of the second material and being exposable by wear of the second material.

7. The method of claim 6, wherein the densification process comprises spark plasma sintering (SPS).

8. The method of claim 7, further comprising:
disposing the precursor between an upper press platen and a lower press platen;
applying mechanical pressure to the precursor; and
passing a pulsed electrical current through the precursor.

9. The method of claim 6, wherein the pieces of the first material are fragments of crushed used machine tool inserts.

10. The method of claim 6, wherein the pieces of the first material have an average shortest diameter, and the powder of the second material has an average longest particle diameter, wherein the average longest particle diameter is less than 0.05 times the average shortest diameter.

11. The method of claim 6, wherein the pieces of the first material have an average shortest diameter, and the powder of the second material has an average longest particle diameter, wherein the average longest particle diameter is less than 0.005 times the average shortest diameter.

12. The method of claim 6, wherein the pieces of the first material have an average shortest diameter, and the powder of the second material has an average longest particle diameter, wherein the average longest particle diameter is less than 0.00005 times the average shortest diameter.

13. The method of claim 6, wherein the second material has a hardness that is less than ½ as hard as the first material.

14. The method of claim 6, wherein a bonding force between the pieces of the first material and the second material is greater than a strength of the pieces of the first material.

15. A method of manufacturing a composite structure comprising the steps of:
providing a plurality of pieces of a first material having cutting edges;
placing a second material in intimate contact with the plurality of pieces of the first material to form a precursor, the second material having a hardness that is less than ½ as hard as the first material; and
subjecting the precursor to a densification process that comprises hot isostatic pressing (HIP), thereby converting the powder and plurality of pieces of the first material to a substantially fully dense composite cladding, the composite cladding having pieces of the first material interspersed with the second material, at least some cutting edges of the first material initially lying beneath a surface of the second material and being exposable by wear of the second material.

16. The method of claim 15, wherein the pieces of the first material are randomly oriented when interspersed with the second material.

17. A method of manufacturing a composite structure comprising the steps of:
providing a plurality of pieces of a first material having cutting edges, wherein the pieces of the first material each have an irregular, nonuniform shape;
placing a second material in intimate contact with the plurality of pieces of the first material to form a precursor, the second material having a hardness that is less than ½ as hard as the first material; and
subjecting the precursor to a densification process, thereby converting the powder and plurality of pieces of the first material to a substantially fully dense composite cladding, the composite cladding having pieces of the first material interspersed with the second material, at least some cutting edges of the first material initially lying beneath a surface of the second material and being exposable by wear of the second material.

18. The method of claim 17, wherein the densification process comprises spark plasma sintering (SPS).

\* \* \* \* \*